United States Patent [19]

Vogel

[11] Patent Number: 4,571,482
[45] Date of Patent: Feb. 18, 1986

[54] ELECTRIC RESISTANCE HEATER ASSEMBLY FOR SOLDERING AND DESOLDERING DEVICES

[75] Inventor: Alan D. Vogel, Columbia, Md.

[73] Assignee: Pace, Inc., Laurel, Md.

[21] Appl. No.: 546,173

[22] Filed: Oct. 27, 1983

[51] Int. Cl.⁴ .................. H05B 3/30; H01C 1/02; B23K 3/02
[52] U.S. Cl. .................. 219/237; 219/240; 219/534; 219/541; 219/543; 219/544; 219/551; 228/51; 338/249; 338/254; 338/293; 338/314
[58] Field of Search .................. 219/221, 227–232, 219/236–241, 541, 542, 544, 551, 534, 540, 530, 543; 338/293, 314, 243–249, 254, 255, 290; 228/51–55

[56] References Cited

U.S. PATENT DOCUMENTS

| | | | |
|---|---|---|---|
| 953,393 | 3/1910 | Parkhurst | 338/293 X |
| 1,046,887 | 12/1912 | Stanley | 219/544 X |
| 1,067,869 | 7/1913 | Falkenberg | 338/247 |
| 1,075,517 | 10/1913 | Taylor | 338/243 |
| 1,154,409 | 9/1915 | Kuhn et al. | 338/293 X |
| 1,158,488 | 11/1915 | Hadaway | 338/255 X |
| 1,171,104 | 2/1916 | Denhard | 219/540 X |
| 1,203,044 | 10/1916 | Juniper | 219/540 |
| 1,384,467 | 7/1921 | Homan | 338/293 X |
| 1,496,077 | 6/1924 | Whipple | 219/237 |
| 1,520,913 | 12/1924 | Simon | 219/239 |
| 1,890,780 | 12/1932 | Gray | 338/254 X |
| 1,904,594 | 4/1933 | Abbott | 338/290 X |
| 2,144,724 | 1/1939 | Lawrence | 219/227 |
| 2,214,084 | 9/1940 | Lovice | 219/237 X |
| 2,250,602 | 7/1941 | Pierce | 219/229 |
| 2,432,800 | 12/1947 | Reichold | 338/293 |
| 2,473,183 | 6/1949 | Watson | 219/543 |
| 2,553,762 | 5/1951 | Gyuris | 338/293 X |
| 3,808,573 | 4/1974 | Cappell | 338/249 |

FOREIGN PATENT DOCUMENTS

| | | | |
|---|---|---|---|
| 52848 | 9/1910 | Switzerland | 338/293 |
| 1166528 | 7/1968 | United Kingdom | 338/255 |

OTHER PUBLICATIONS

"Thermofoil Heat Fusers", Bulletin TF-5, Minco Products Inc., Minneapolis, Minn., Form 7Y615, revised 3/20/75, 4 pages.

Primary Examiner—A. Bartis
Attorney, Agent, or Firm—Murray, Whisenhunt and Ferguson

[57] ABSTRACT

Electric heater assembly for use typically with hand-held soldering or desoldering devices includes an elongated resistance element formed from a thin flat metal foil having three connected areas of different resistance, the differing resistance being caused by the different widths of the areas. The first area, to which terminals are attached, is the widest and acts as a heat sink. The second area decreases in width to the first area and acts as a transition area between the first and third areas. The first and second areas include first and second separated portions for providing electrical current to the first area and returning it therefrom. The first area includes first and second strips respectively connected to the first and second portions of the second area. The strips extend adjacent a first side edge of the third area in a side-by-side relationship to the distal end of the resistance element and then back towards the second area to a position where they are connected to one another. The side-by-side position of the strips at the distal end of the third area facilitates application of heat to a work. An assembly for enclosing the resistance element to electrically isolate it from the work includes layers of insulating material between which the resistance element positioned and a sheet metal housing enclosure.

14 Claims, 4 Drawing Figures

U.S. Patent  Feb. 18, 1986  4,571,482
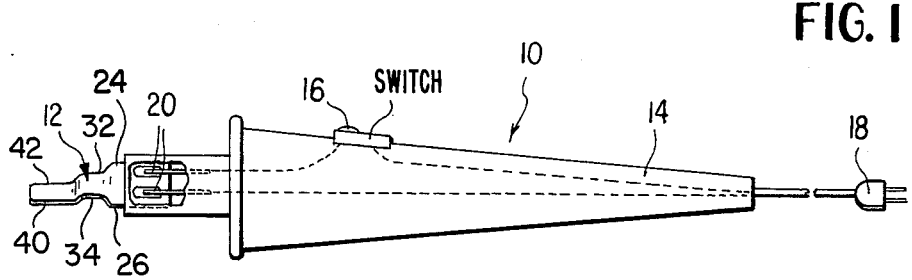
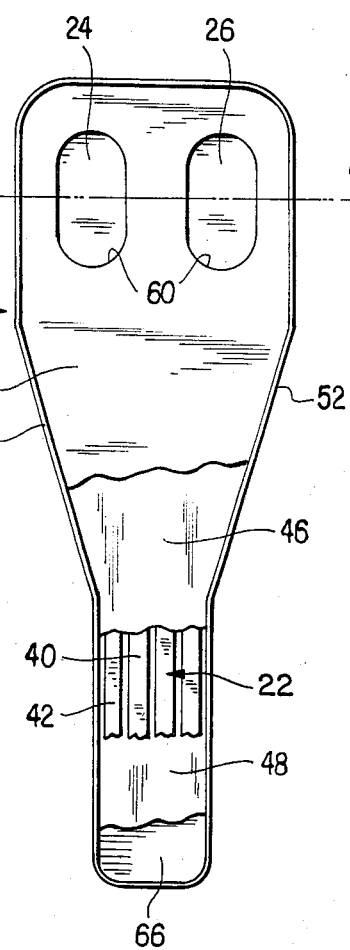
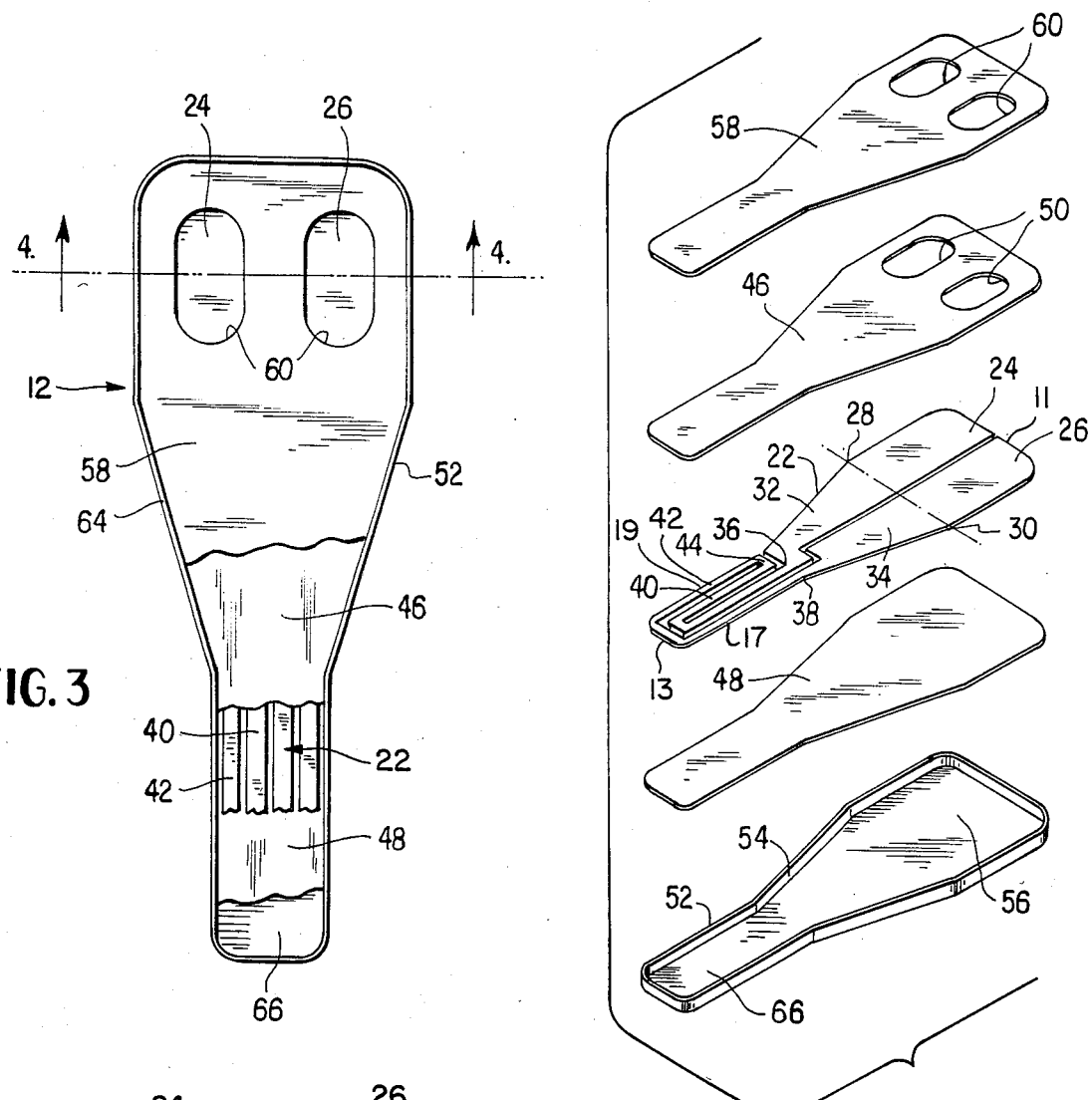
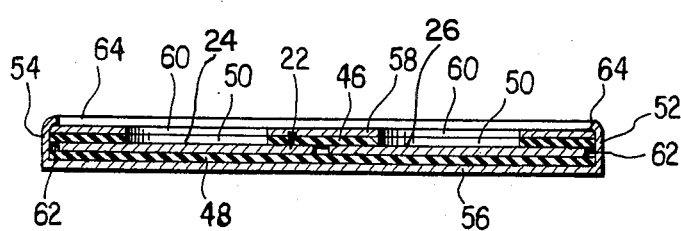

ELECTRIC RESISTANCE HEATER ASSEMBLY FOR SOLDERING AND DESOLDERING DEVICES

BACKGROUND OF THE INVENTION

This invention relates to electric heater assemblies and more specifically to an assembly using a thin foil resistance element in a novel enclosure and configuration to control the location and intensity of heat generated.

PRIOR ART AND OBJECTS

Applicant is unaware of any heater assembly adapted to be used in hand held soldering or desoldering devices which utilizes a resistance element of thin foil etched in a configuration and encased in a metal enclosure that results in maximum heat dissipation at the working tip end but limits the transfer of heat to the terminal ends.

Heater assemblies for soldering or desoldering devices are well known and typically consists of resistance wire wound about the tool remote from the tip or about a bobbin or the like in which the tool is removably mounted, the ends of the resistance wire then being connected to terminals which in turn are connected to a source of electric current. This construction does not result in a concentration of high heat at the tip end and away from the terminals as is most desirable but rather in a bulky device which has the heat distributed substantially equally over a wide area. Heater assemblies housing a resistance element positioned between layers of insulating material all encased in a sheet metal enclosure are well known as shown in U.S. Pat. Nos. 1,150,426 and 3,808,573, however, none of these are adapted to be used as the tool portion of a hand held soldering or desoldering device nor do they disclose applicant's novel resistance element of thin foil disposed in a configuration which results in high heat concentration at the tip end of the tool and low heat at the terminal end and enables the terminal end to exhibit the characteristics of a heat sink and buffer to thereby reduce the transfer of heat from the tip end or work itself to the terminal end.

It is therefore the primary object of the present invention to provide a superior electric heater assembly adapted to be used in hand held soldering or desoldering devices.

It is another object of the present invention to provide a heater assembly having a resistance element of thin foil disposed in a novel configuration to maximize the dissipation of heat at the tip or working end of the assembly and minimize it at the terminal end thereof.

It is a further object of the present invention to provide a resistance element of the aforedescribed character which is positioned between layers of insulating material and encased in a sheet metal housing which exposes the terminal ends of the element to facilitate the connection thereof to a source of electric current.

It is yet another object of the present invention to provide a heater assembly which combines simplicity and durability in a high degree but yet is relatively inexpensive in construction.

These and other objects of the invention will in part be obvious and in part pointed out in the following description and accompanying drawings, which are merely illustrative of the present invention.

The foregoing objects are obtained by providing an electric heater assembly comprising an elongated resistance element formed from a thin flat metal foil having three connected areas of different resistance, the differeing resistance being caused by the different widths of the areas. The first area, to which terminals are attached, is the widest and acts as a heat sink. The second area decreases in width to the first area and acts as a transition area between the first and third areas. The first and second areas include first and second separated portions for providing electrical current to the first area and returning it therefrom. The first area includes first and second strips respectively connected to the first and second portions of the second area. The strips extend adjacent a first side edge of the third area in a side-by-side relationship to the distal end of the resistance element and then back towards the second area to a position where they are connected to one another. The side-by-side position of the strips at the distal end of the third area facilitates application of heat to a work. An assembly for enclosing the resistance element to electrically isolate it from the work includes layers of insulating material between which the resistance element positioned and a sheet metal housing enclosure.

BRIEF DESCRIPTION OF THE DRAWING

FIG. 1 is a perspective view of the electric heater assembly of the present invention connected to a hand grip, FIG. 2 is a separated, perspective view of parts included in the preferred embodiment, FIG. 3 is a top view of the electric heater assembly having a portion thereof broken away, and FIG. 4 is an enlarged cross-sectional view taken along the lines 4—4 of FIG. 3.

DESCRIPTION OF THE PREFERRED EMBODIMENT

Referring now to the drawings where like characters of reference indicate like elements in each of the several figures, 10 indicates generally a soldering or desoldering type tool having the electric heater assembly 12 of the present invention held by a hand grip 14. The hand grip 14 would typically have a switch 16 in series with a pair of contacts 20 for connecting the heater assembly 12 to an electrical plug 18.

The heater assembly 12 includes an elongated resistance or heater element 22 of very thin nickel-chromium foil which is formed into the novel shape disclosed, as best seen in FIG. 2, by an etching process. More specifically, the element 22 has a proximal end 11 and a distal end 13 and includes three distinct areas of differing resistance which, of course, results in three different intensities of heat generated. The first or terminal areas 24, 26 are identical and extend from one end of the element to a point 28, 30 where the sides begin to taper inwardly. The second or intermediate areas 32, 34 vary in area and extend from the points 28, 30 respectively, to the point 36, 38 where the width of the element is substantially the same. The third or working areas 40, 42 extend as a narrow strip of constant width from a first position generally comprising the points 36, 38 respectively, to a second position comprising the tip end 44 where they are joined to form a continuous ribbon of foil with the first and second areas where the width of the thrid area should be no greater than the smallest width of the second area. The working areas 40, 42 extend in parallel, spaced apart relationship to each other from the points 36, 38 along side edge 15, distal end 13, side edge 17, and then to tip end 44 via side edge 19 to form a substantially U-shape. The particular operating characteristics of the heater element 22 and the function of the various areas 22, 24, 32, 34 and 40, 42 will be more fully described later.

The heater element 22 is positioned between two thin sheets of mica 46, 48 which have the same general shape as the heater element 22 only slightly larger and in effect overlap the edges of the heater element 22. The upper mica sheet 46 has two similar apertures 50 therethrough which, when positioned on the heater element 22, expose the terminal areas 24, 26. The lower mica sheet 48 has no apertures and entirely covers the underside of the heater element 22 when positioned adjacent it. The upper mica sheet 46, heater element 22 and lower mica sheet 48 are placed in a container 52 having a continuous upstanding side wall 54 around the edge of a bottom 56 in the same general configuration as the mica sheets 46, 48. A top 58 for the container 52 is also provided having the same shape as the mica sheet 48 and two apertures 60 which, when the top 58 is positioned over the mica sheet 46, are in registry with the apertures 50 to expose the terminal areas 24, 26. The container 52 and top 58 are typically constructed of a metal such as stainless steel.

As can now be seen by referring to FIGS. 3 and 4, the mica sheet 48 is positioned in the container 52 adjacent the bottom 56. The heater element 22 is then positioned on the mica sheet 48 such that a space 62 exists between the periphery of the heater element 22 and the side wall 54 of the container 52 to effectively prevent contact therebetween. The mica sheet 46 is positioned over the heater element 22 followed by the top 58 with their respective apertures 50, 60 in registry above terminals 24, 26. The top edge 64 of the side wall 54 is then rolled over or crimped onto the top 58 to thereby compress the heater element 22 and mica sheets 46, 48 into good heat conductive relationship with each other and the top 58 and more significantly the bottom 56 of the container 52 to complete the heater assembly 12.

In operation, as electric current is applied across the nickel-chromium heater element 22 at terminals 24, 26 the working area 40, 42 and tip end 44 will generate the most heat due to the narrow width thereof and this heat will be transmitted to the narrow end 66 of the container 52 which is the working end or area that will be brought into contact with the work (not shown) for soldering, desoldering or other purposes. The heat generated in the second or intermediate area 32 diminishes gradually as the width thereof increases from points 36, 38 to points 28, 30. The heat generated at the terminal areas 24, 26 is minimal and as such does not effect the means of making electrical contact therewith such as contacts 20 nor does it radiate heat of a degree that would make the hand grip uncomfortable to hold. In addition, the tapered nature of the intermediate areas 32, 34 acts as a buffer zone between high, intense heat generated at the tip 44 and adjacent working area 40, 42, and the terminal 24, 26 which acts to blend the heat generated and prevent heat from being transferred from the work areas to the terminal area or withdrawn from the work itself and transferred to the terminal areas. The terminal areas 24, 26 function as a heat sink. Thus, as can be seen by the foregoing description, applicant's novel construction of the heater assembly results in maximum heat being generated and substantially confined to the tip 44 and working area 40, 42 adjacent the narrow end 66 of container 52 where it is desired and not across the entire assembly as is the heat generated in similar devices of the prior art.

As can be seen from FIG. 1, at least one of the three areas may be disposed in a plane different from the others. Thus, as shown, third or working areas 40, 42 may be in a lower plane than the first or terminal areas 24, 26 where second or intermediate areas 32, 34 bend downwardly from the third area to the first area.

Having thus described the invention, what is claimed as new and to be secured by Letters Patent is:

1. A strip heater assembly comprising:
   an elongated resistance element formed from a thin flat metal foil and having a proximal end and a distal end, the resitance element including three connected areas of differing resistance where (a) the first area includes first and second end portions spaced from one another in side-by-side relationship at said proximal end and respectively adapted for connection to a source of electrical energy, (b) the second area decreases in width from the first area to the third area, the second area including first and second portions spaced from one another and each having first and second ends respectively connected at the first ends thereof to the first and second portions of the first area, and (c) the third area having a width no greater than the smallest width of the second area and including first and sesecond strips respectively connected at one end thereof to the second ends of said first and second portions of the second area, said first and second strips being spaced from one another and extending from a first position at said second ends of said portions of said second area to the distal end of the resistance element and then back towards said second area to a second position spaced from the distal end and located in the third area, the other ends of said first and second strips being connected to one another at said second position, said strips being in a continuous side-by-side relationship at least at said distal end, said third area having a higher electrical resistance than said second area, and said second area having a higher electrical resistance than said first area such that said third area is adapted to apply heat to a work and said first area acts as a heat sink due to the gradual decrease in generated heat occurring in the tapered second area; and
   means for enclosing said resistance element to electrically isolate it from said work.

2. An assembly as in claim 1 where said third area has first and second side edges and where said first and second positions are, respectively, at said first and second side edges and said first and second strips maintain said side-by-side relationship from said first position to said second position.

3. An assembly as in claim 2 where said third area is substantially U-shaped and where said first and second strips extend adjacent said first side edge from said first position to the distal end of the resistance element and then from said distal end adjacent said second side edge to said second position.

4. An assembly as in claims 1, 2, or 3 where said means for enclosing said resistance element includes a sheet metal channel having a base and upstanding sides, a first sheet of insulating material within said channel adjacent said base and one side of said resistance element, a second sheet of insulating material within said channel adjacent the side of said resistance element opposite said one side and having holes therethrough to expose said first and second end portions, and a sheet metal cover plate positioned on said second sheet of insulating material and having holes in registry with said holes in said second sheet of insulating material so that said source of electrical energy may be connected to said first and second end portions, said upstanding sides of said sheet metal channel being bent over said sheet metal cover plate to hold said assembly together.

5. An assembly as in claim 1 where said resistance element comprises etched foil.

6. An assembly as in claim 1 where said three areas are co-planar.

7. An assembly as in claim 1 where at least one of said three areas is disposed in a plane different from that of the others.

8. A heating device for soldering or desoldering an electrical connection comprising
 a handle having a distal end;
 a strip heater assembly projecting from said distal end and including
 an elongated resistance element formed from a thin flat metal foil and having a proximal end and a distal end, the resistance element including three connected areas of differing resistance where (a) the first area includes first and second end portions spaced from one another in side-by-side relationship at said proximal end and respectively adapted for connection to a source of electrical energy, (b) the second area decreases in width from the first area to the third area, the second area including first and second portions spaced from one another and each having first and second ends respectively connected at the first ends thereof to the first and second portions of the first area, and (c) the third area having a width no greater than the smallest width of the second area and including first and second strips respectively connected at one end thereof to the second ends of said first and second portions of the second area, said first and second strips being spaced from one another and extending from a first position at said second ends of said portions of said second area to the distal end of the resistance element and then back towards said second area to a second position spaced from the distal end and located in the third area, the other ends of said first and second strips being connected to one another at said second position, said strips being in a continuous side-by-side relationship at least at said distal end, said third area having a higher electrical resistance than said second area, and said second area having a higher electrical resistance than said first area such that said third area is adapted to apply heat to a work and said first area acts as a heat sink due to the gradual decrease in generated heat occurring in the tapered second area; and
 means for enclosing said resistance element to electrically isolate it from said work; and
 means for connecting to said heater assembly a source of electrical energy.

9. A device as in claim 8 where said third area has first and second side edges and where said first and second positions are, respectively, at said first and second side edges and first and second strips maintain said side-by-side relationship from said first position to said second position.

10. A device as in claim 9 where said third area is substantially U-shaped and where said first and second strips extend adjacent said first side edge from said first position to the distal end of the resistance element and then from said distal end adjacent said second side edge to said second position.

11. A device as in claims 8, 9, or 10 where said means for enclosing said resistance element includes a sheet metal channel having a base and upstanding sides, a first sheet of insulating material within said channel adjacent said base and one side of said resistance element, a second sheet of insulating material within said channel adjacent the side of said resistance element opposite said one side and having holes therethrough to expose said first and second end portions, and a sheet metal cover plate positioned on said second sheet of insulating material and having holes in registry with said holes in said second sheet of insulating material, said upstanding sides of said sheet metal channel being bent over said sheet metal cover plate to hold said assembly together and where said means for connecting said heater assembly to said source of electrical energy includes two electrical leads extending through the holes in the second sheet of insulating material and the sheet metal cover plate and connecting with said first and second end portions of the first area of the resistance element.

12. A device as in claim 8 where said resistance element comprises etched foil.

13. A device as in claim 8 where said three areas are co-planar.

14. A device as in claim 8 where at least one of said three areas is disposed in a plane different from that of the others.

* * * * *